United States Patent [19]

Gilmore et al.

[11] 4,123,692
[45] Oct. 31, 1978

[54] ADJUSTABLE SPEED ELECTRIC MOTOR DRIVE HAVING CONSTANT HARMONIC CONTENT

[75] Inventors: Thomas P. Gilmore, Wauwatosa; Frederick A. Stich, Milwaukee, both of Wis.

[73] Assignee: Allis-Chalmers Corporation, Milwaukee, Wis.

[21] Appl. No.: 735,609

[22] Filed: Oct. 26, 1976

[51] Int. Cl.² .................... H02P 5/40; H02P 7/62
[52] U.S. Cl. .................... 318/227; 318/230; 318/231; 318/341; 363/41; 363/42
[58] Field of Search ............ 318/227, 230, 231, 341, 318/171; 363/41, 42

[56] References Cited

U.S. PATENT DOCUMENTS

| 3,392,316 | 7/1968 | Salihi | 318/227 |
|---|---|---|---|
| 3,617,840 | 11/1971 | Salihi | 318/227 |
| 3,694,718 | 9/1972 | Graf et al. | 318/230 |
| 3,815,003 | 6/1974 | Wiart | 318/227 |
| 3,971,972 | 7/1976 | Stich | 318/230 |
| 4,024,444 | 5/1977 | Dewan et al. | 318/227 |

Primary Examiner—Robert K. Schaefer
Assistant Examiner—Eugene S. Indyk
Attorney, Agent, or Firm—Lee H. Kaiser

[57] ABSTRACT

An adjustable speed AC electric motor drive has a static inverter energized from a unidirectional power source through a semiconductor series chopper and eliminates a filter between chopper and inverter and controls the fundamental inverter output frequency as a function of an analog speed reference signal and also pulse width modulates the series chopper at a constant frequency as a function of the speed reference signal and synchronizes the series chopper to the fundamental inverter freqency to provide variable voltage and variable frequency power to the motor. The drive has a shunt chopper at the output of the series chopper and switches it to the opposite conductive state from the series chopper so that it coacts with the feedback diodes to form substantially continuous, low impedance, bidirectional free-wheeling paths for motor current and provides constant harmonic content current to the motor with reduced ripple.

29 Claims, 7 Drawing Figures

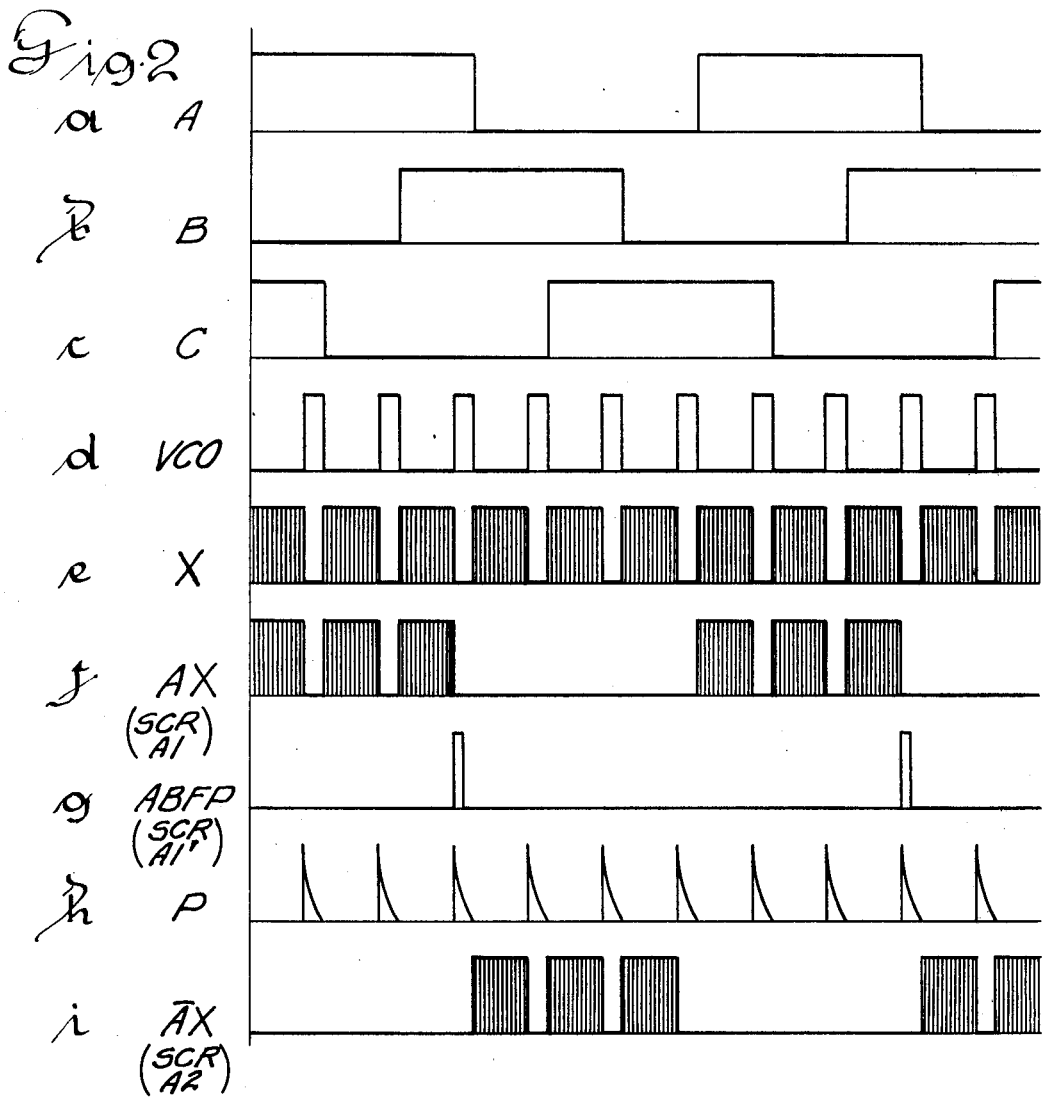
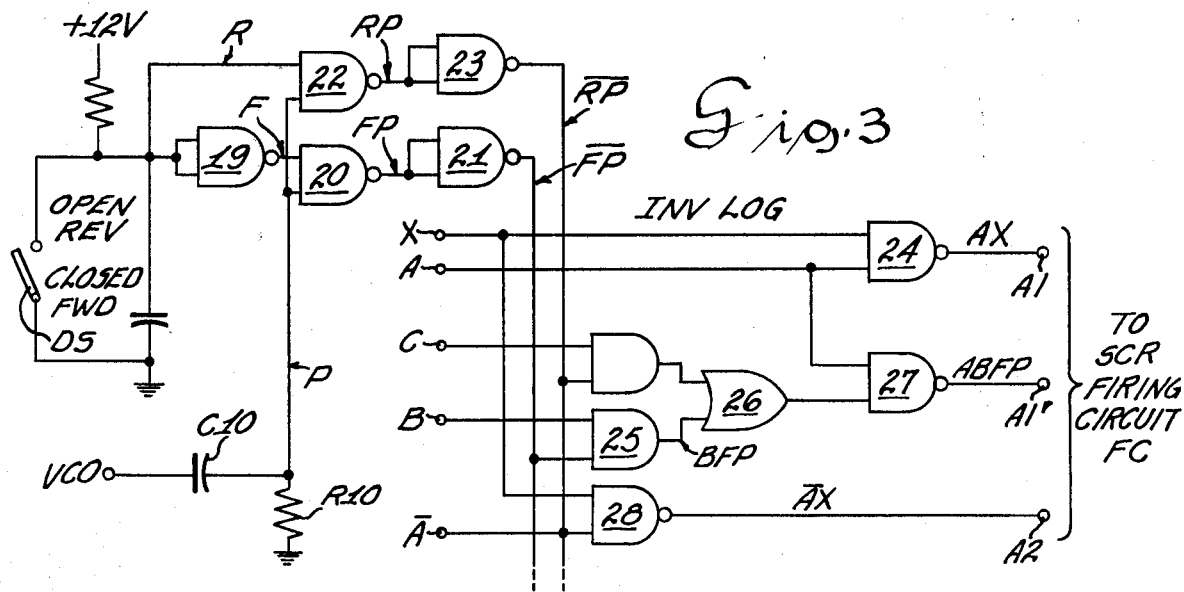

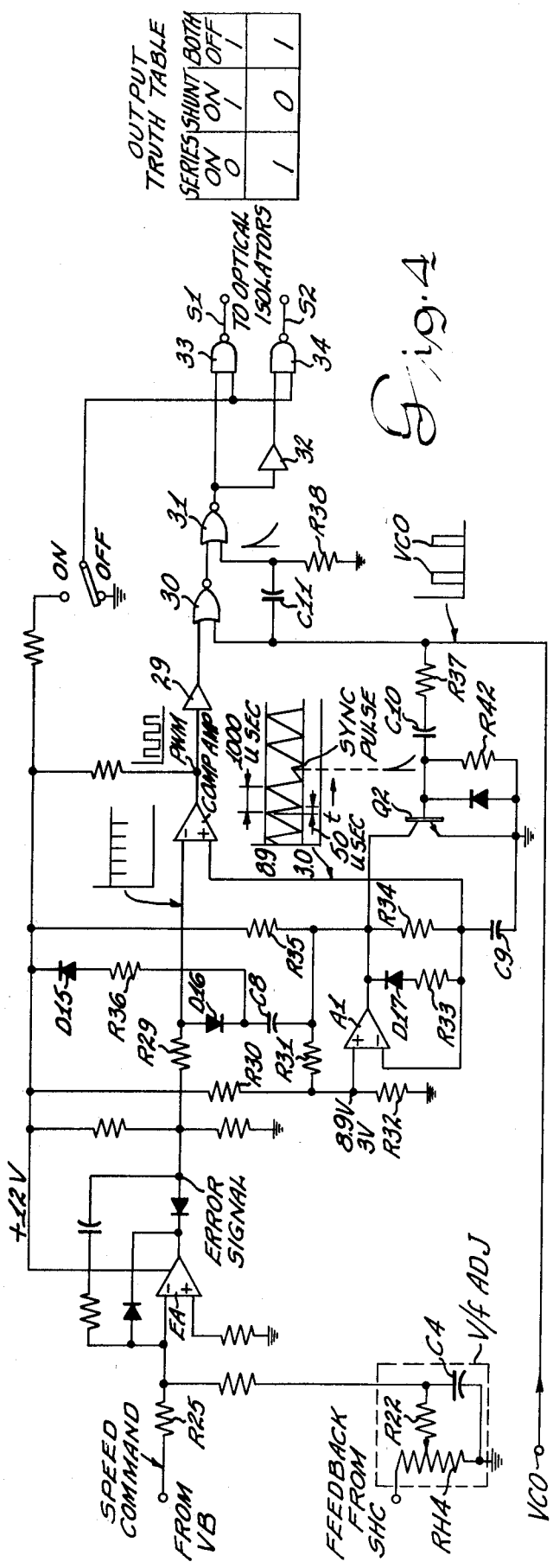
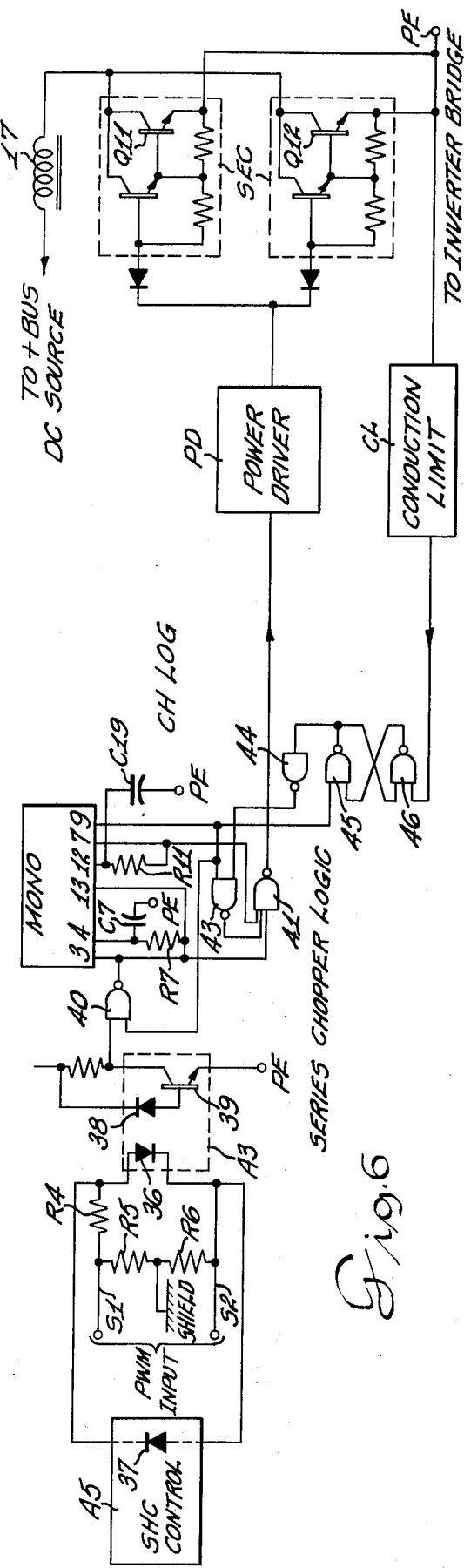

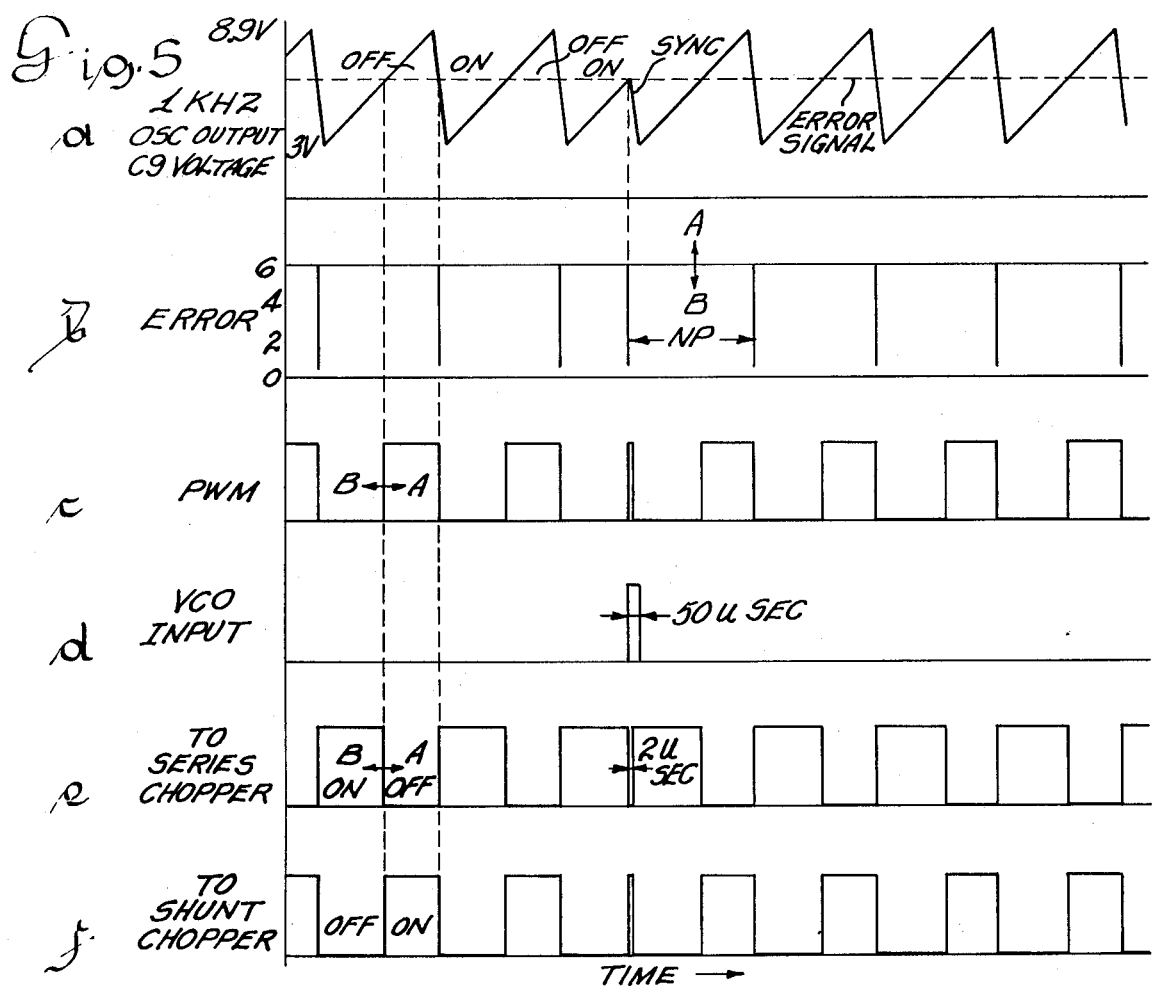
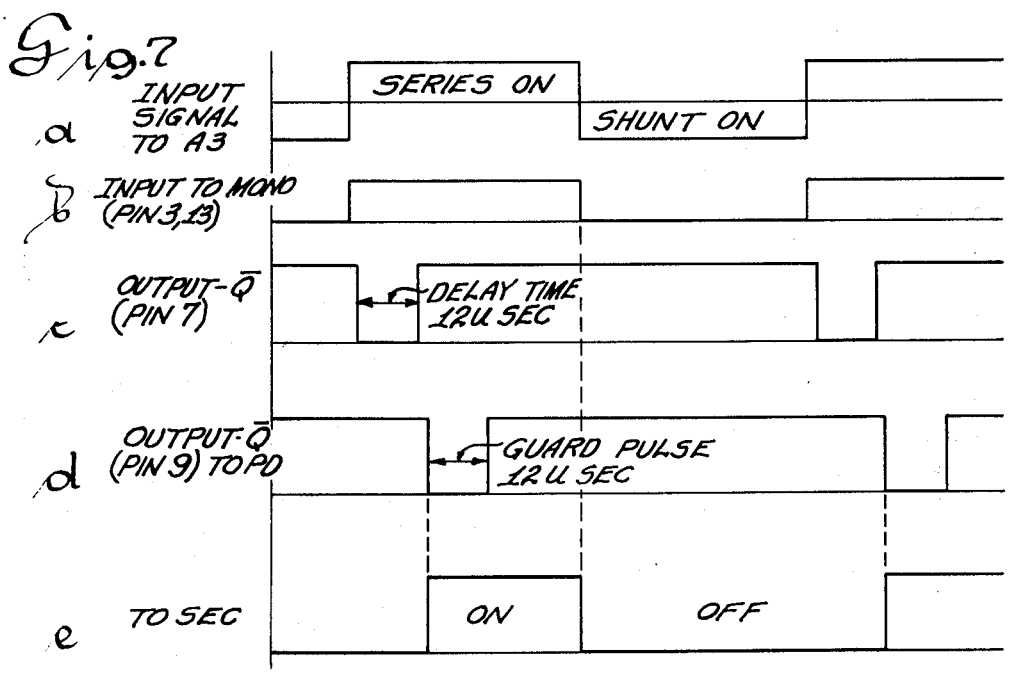

ADJUSTABLE SPEED ELECTRIC MOTOR DRIVE HAVING CONSTANT HARMONIC CONTENT

BACKGROUND OF THE INVENTION

Chopper type inverters are known in which semiconductor switches are connected in a bridge across the positive and negative sides of a DC source and controlled to provide selectively variable frequency and variable voltage polyphase power to a load such as an AC motor, but known chopper type inverters require a filter between the chopper and the power bridge to isolate the inverter from the DC source during transient operating conditions of the motor.

Pulse width modulated (PWM) inverters are known wherein the carrier ratio (i.e., carrier frequency to inverter fundamental frequency) remains constant over the operating range of the inverter, but many inverters are variable ratio synchronized carrier systems wherein the carrier steps through a sequence of ratios and switch points as the operating frequency is increased, thereby permitting a wider range of inverter output voltage, perhaps in the order of 10:1.

Known chopper type inverters having feedback diodes in shunt to the inverter semiconductor switches require a filter between DC source and the inverter bridge in order to reduce motor current ripple and effect a stable system. The motor current path is interrupted when the inverter swtiches are open, and when no filter is provided, the voltage at the motor terminals is indeterminate. The motor current decays rapidly and may be discontinuous so no current is flowing in the motor, particularly during low excitation. Such open motor current paths may result in high ripple and low-frequency harmonics in the motor current at low motor speeds, and this may cause overheating of the motor and instability in the drive system when no filter is utilized. However, if a filter is provided, the filter voltage varies in accordance with the motor voltage, and accordingly when the motor is running at low speed, the low filter voltage, in effect, provides a low impedance path for the motor current so that motor current flow is substantially continuous, ripple in the motor current at low motor speed is reduced, and system stability is improved. However, such filter is expensive, and the inductance and capacitance of the filter in known inverters introduces a time lag which prevents fast system response and also may, in itself, lead to motor instability.

In known inverters with forced commutation, the voltage across the commutation capacitors increases in proportion to the magnitude of the inverter output current, and this can result in overcharge on the commutation capacitors as well as commutation failure within the inverter.

OBJECTS OF THE INVENTION

It is an object of the invention to provide an improved chopper-type polyphase inverter which eliminates the necessity of a filter between chopper and power bridge and thus has faster response than prior art inverters.

A further object is to provide such an improved chopper-type polyphase inverter which is lower in cost, faster in response, and more stable in operation than prior art inverters that utilize a filter between chopper and inverter bridge.

Another object of the invention is to provide an improved adjustable speed electric motor drive having a chopper-type polyphase inverter for controlling the electric motor by PWM switching and which provides substantially constant harmonic current waveforms to the motor.

A still further object of the invention is to provide an improved adjustable speed electric motor drive having a chopper-type polyphase inverter which provides low impedance, bidirectional, free-wheeling paths for motor currents when the inverter switches are open, thereby obviating the above disadvantages of prior art drives which did not have a filter between chopper and inverter bridge. Another object is to provide such an improved chopper-type polyphase inverter which maintains continuous motor current flow through such free-wheeling paths so that motor current does not substantially decay while the inverter switches and series chopper are turned off, thereby providing smoother current flow to the motor with less ripple in the inverter output current and inherently improving motor stability. A more specific object is to provide such an improved inverter having a chopper in shunt to the series chopper and which is synchronized thereto to provide, when the series chopper is turned off: (a) well-defined voltage levels at the motor terminals, and (b) low impedance, bidirectional, free-wheeling paths that coact with the feedback diodes to maintain substantially continuous current flow to the motor.

A further object of the invention is to provide an improved chopper-type polyphase inverter having means to synchronize the chopper to the fundamental output frequency so that the chopper is conducting during commutation, thereby assuring that the commutation capacitors remain charged and that commutation failure will not occur. Another object is to provide such a chopper-type polyphase inverter having means to synchronize the chopper to the fundamental frequency so the chopper is reset at the beginning of each half cycle of drive frequency to assure that: (a) chopping is identical in both half cycles of the fundamental frequency; (b) minimum DC-component and low frequency AC are present in the current waveform to the motor; and (c) the harmonic content does not change with variation in motor speed.

It is a still further object of the invention to provide an improved chopper-type polyphase inverter which has no storage elements between chopper and power bridge so the current from the DC source to the chopper can be directly limited and thus the inverter can feed directly into a short circuit without damaging the semiconductor switches.

Another object is to provide an improved chopper-type polyphase inverter which has a wide range of output voltages and synchronizes the chopper frequency to the fundamental frequency but does not require switching the carrier through a sequence of carrier ratios and switch points as the operating frequency is varied. A further object is to provide such an improved chopper-type polyphase inverter having no storage elements between chopper and power bridge and means to limit the current which can be conducted by the chopper, thereby providing a limit on the charge on the commutation capacitors and preventing commutation failures within the inverter.

DESCRIPTION OF THE DRAWINGS

The above and other objects and advantages of the invention will be more readily apparent from the following detailed description when considered in conjunction with the accompanying drawings wherein:

FIGS. 2a–2i show electrical signals present in the system of FIG. 1;

FIG. 3 illustrates a portion of one phase of the inverter logic circuit;

FIG. 4 is a schematic circuit diagram of the means for deriving constant frequency ramp signals and for comparing them to an error signal to derive variable width pulses for modulating the series chopper and for synchronizing the series chopper to the fundamental inverter frequency;

FIGS. 5a–5f show electrical signals present in the circuit of FIG. 4;

FIG. 6 illustrates the control logic for the series chopper; and

FIGS. 7a–7e illustrate electrical signals present in the circuit of FIG. 6.

SUMMARY OF THE INVENTION

Figure 1:
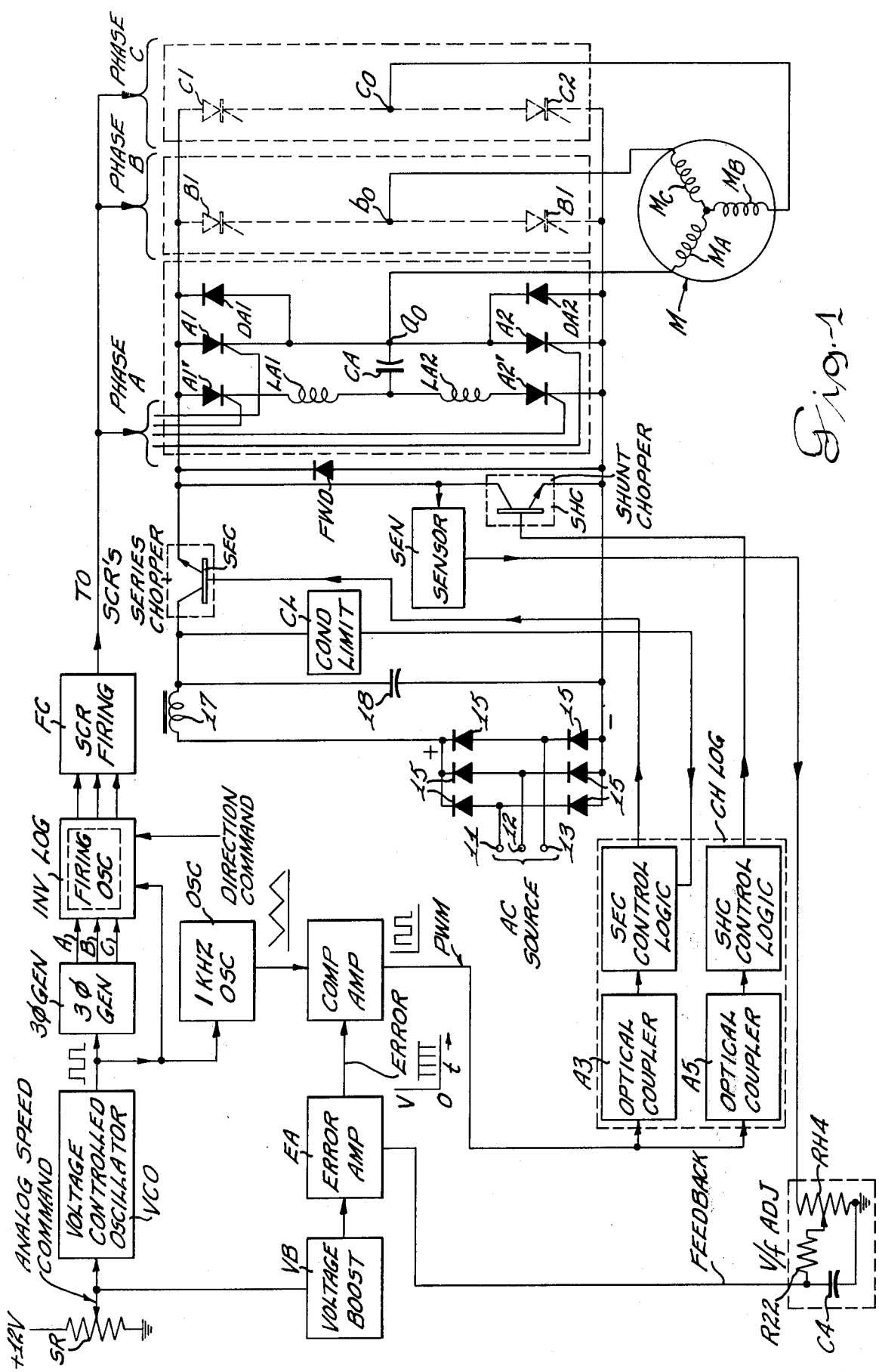
FIG. 1 is a schematic diagram, partly in block form, of an adjustable speed electric motor drive system embodying the invention.

A static inverter in accordance with the invention for an adjustable speed AC motor drive is energized from a unidirectional power source through a semiconductor series chopper and controls the fundamental output frequency of the inverter as a function of an analog speed reference signal and also time ratio controls the series chopper at a constant frequency as a function of the speed reference signal and synchronizes the series chopper to the fundamental output frequency to provide selectively variable voltage and frequency to the motor. The preferred embodiment has a semiconductor shunt chopper at the output of the series chopper and switches it to the opposite conductive state from the series chopper to form together with the feedback diodes, substantially continuous, low impedance, bidirectional, free-wheeling paths for the motor current so that motor current does not substantially decay when the inverter switches and series chopper are turned off and the current flow to the motor is smoother with reduced ripple.

In the preferred embodiment, an $n$ phase inverter has series connected positive and negative load current carrying semiconductor switches in each phase with an output terminal at their junction for connection to the respective phase windings of the motor and also has means including commutation capacitors for commutating off the load current carrying switches; a voltage controlled oscillator generates a train of modulation frequency controlling pulses at a frequency proportional to the analog speed reference signal; an $n$ phase generator derives $n$ phase reference square waves displaced $360/n°$ apart, each of which has a period which embraces a plurality of modulation frequency controlling pulses and regulates switching of the semiconductor switches in one inverter phase; an oscillator derives a train of constant frequency, generally triangular ramp pulses; a sensor derives a feedback signal proportional to the average voltage across the shunt chopper; an error amplifier compares the speed reference signal to the feedback signal and derives a unidirectional error signal proportional to their difference; a comparator compares the ramp pulses to the unidirectional error signal to derive variable width, constant frequency PWM rectangular pulses for modulating the series chopper; synchronizing means reduce the output of the constant frequency, ramp pulse generating oscillator to minimum value in response to each modulation frequency controlling pulse so that the series chopper is reset at the beginning of each half cycle of drive frequency and assure that chopping is identical in both half cycles of inverter output frequency; the variable width PWM pulses are transmitted to series and shunt choppers through separate control logic which are interconnected to make it impossible to turn on both choppers simultaneously; and the turn-on signals for the load current carrying switches are removed during the modulation frequency controlling pulses and turn-on signals are derived for the commutation semiconductor switches during such modulation frequency controlling pulses at the trailing edge of each phase reference square wave so that commutation occurs when the series chopper is conducting.

DETAILED DESCRIPTION

The adjustable speed drive system of the invention converts direct current (DC) power from a unidirectional source to alternating current (AC) power and also selectively controls the frequency and the magnitude of AC power supplied to a load. As illustrated in FIG. 1, the unidirectional source may be a conventional three-phase bridge rectifier having input terminals 11, 12, 13 coupled across a three-phase source of electrical power and comprises three diode rectifiers 15 having commoned cathodes supplying a positive bus (+) and three diode rectifiers 15 having commoned anodes coupled to a negative bus (−) of the unidirectional source. A suitable smoothing filter comprising an inductor 17 in series with the positive bus (+) and a shunt capacitor 18 connected across the positive and negative busses may smooth the pulsating bridge rectifier output.

The undirectional source may supply power through a current controlling series transistor chopper SEC to a series inverter power bridge comprising six load current carrying semiconductor switches, preferably controlled rectifiers (SCR's) A1, A2, B1, B2, C1, C2 which convert the DC power to AC power and also control the magnitude and frequency of power supplied to a load such as an induction motor M. Series transistor chopper SEC may provide time ratio control (for example, pulse width modulation) of the average voltage supplied from the inverter to the motor M. Two semiconductor switches are in series in each phase of the inverter power bridge, e.g., A1 and A2 in phase A, across the positive and negative busses so that the SCR's are arranged in the three legs of the inverter power bridge for power inversion with each leg containing a pair of positive and negative switches and with a phase output terminal at the node, or juncture, between the switches, such as output terminal $a_o$ for phase A. Only the details of phase A of the inverter power bridge are illustrated in FIG. 1, phase B and phase C being similar thereto. Each SCR A1 and A2 has a feedback rectifier, or clamping diode DA1 and DA2 respectively connected in parallel with it in reverse polarity relationship to provide a path for reactive load current and limit reverse voltage when the respective switches A1 and A2 are opened. The phase windings $M_A$, $M_B$, $M_C$ of induction motor M may be connected to the inverter power bridge output terminals $a_o$, $b_o$, $c_o$ respectively and are shown to be wye-connected.

The commutation circuit for each phase of the power bridge preferably includes a pair of commutation, or auxiliary gate controlled rectifiers, for example, A1' and A2' for phase A, connected in series with two commutating inductors LA1 and LA2 between the positive and negative busses. One terminal of a commutating capacitor CA is connected to phase output terminal $a_o$ and the other terminal thereof is connected to the junction between inductors LA1 and LA2. Briefly, each load current carrying rectifier A1 and A2 is commutated off in known manner by firing the associated auxiliary SCR (A1' and A2'), thereby producing a pulse of commutating current that reduces the current in the load current carrying rectifier A1 and A2 to below its holding level.

The load current carrying SCR's A1, A2, B1, B2, C1, C2 are gated on and commutated off in a sequence to produce three-phase AC power (with the customary 120° displacement between the phase voltages) and, in addition, series transistor chopper SEC is time ratio controlled, i.e., rapidly turned on and off by variable width signals, to determine the magnitude of average power supplied by the inverter to motor M. Increasing or decreasing the ratio of "on time" of transistor chopper SEC with respect to its "off time" changes the average power supplied to motor M in the same direction, and the chopping by series chopper SEC is synchronized with the inverter fundamental operating frequency to reset the series chopper at the beginning of each half cycle of fundamental frequency so that chopping is identical in both half cycles of the fundamental frequency.

Windings $M_A$, $M_B$, $M_C$ of motor M are supplied with variable frequency, variable voltage electric power from the inverter power bridge switches A1, A2, B1, B2, C1, C2 which conduct in a predetermined sequence at a rate determined by the magnitude of a command, or analog speed reference signal which may be derived from a potentiometer SR. The magnitude of the command signal determines the inverter fundamental output frequency (and thus the speed of motor M) and also determines the ratio of "on" and "off" times for series chopper SEC which, in turn, determines the average voltage applied to the motor M. The inverter output frequency is regulated by a frequency generator which comprises a conventional voltage controlled oscillator VCO shown in block form and derives a train of square wave modulation frequency controlling VCO pulses (FIG. 2d) whose frequency is proportional to the magnitude of the speed command signal. The modulating frequency controlling pulses from oscillator VCO are coupled to a three-phase generator 3 GEN which in known manner may comprise a shift register for providing three-phase square wave reference voltages A, B, C (FIGS. 2a, 2b, 2c) of 180° duration displaced from each other by 120° and their negations $\overline{A}$, $\overline{B}$, $\overline{C}$.

The three-phase reference square waves A, B, C, $\overline{A}$, $\overline{B}$, $\overline{C}$ from 3 GEN are applied to an inverter logic circuit INV LOG which includes a high frequency firing oscillator FIRING OSC that generates a train of pulses X (FIG. 2f) for firing the SCR's A1, A2, etc. Each reference square wave A, B, C is associated with one phase of the inverter bridge and controls the switching of the semiconductor switches for that phase. Inverter logic INV LOG may, for example, generate firing signals AX (FIG. 2f) and $\overline{AX}$ (FIG. 2i) for SCR's A1 and A2 respectively during the A and $\overline{A}$ square waves and also derive firing signals for auxiliary SCR's A1' A2' such as ANFP (FIG. 2g) for SCR A1'.

A shunt transistor chopper SHC connected between the emitter of series chopper SEC and the negative bus (−) is always switched to the opposite state from series chopper SEC. A free-wheeling diode FWD is connected in inverse polarity parallel relation to shunt chopper SHC. Shunt chopper SHC in conjunction with diode FWD and the feedback diodes DA1, DA2, DB1, etc., provides a bidirectional, low impedance, free-wheeling path for motor current and low frequency harmonics which (in the absence of shunt chopper SHC) might increase heating in the motor and result in increased ripple in the motor with resulting motor instability. Series chopper SEC is synchronized with shunt chopper SHC and with the fundamental frequency so that substantially continuous motor current flow is maintained through such free-wheeling paths even while the load current carrying inverter switches and the series chopper are turned off, thus preventing substantial decay in the motor current and providing smoother current flow to the motor with reduced ripple and reduced PWM-induced harmonics.

INVERTER LOGIC

The three-phase 120°-displaced reference square waves A, B, C (FIGS. 2a, 2b, 2c) and their inversions are applied to inverter logic circuit INV LOG shown in block form which also receives the modulation frequency controlling VCO pulses (FIG. 2d) which are at 6 times motor frequency. The INV LOG circuit includes firing oscillator FIRING OSC for deriving high frequency pulses X (FIG. 2e) in the intervals between the VCO pulses for gating the load current carrying and auxiliary SCR's and also includes a logic network which selectively applies the high frequency firing pulses X through an SCR firing circuit FC (shown in block form) to the SCR's, for example, to SCR's A1 (FIG. 2f) and A2 (FIG. 2i) respectively for the duration of the A and $\overline{A}$ square reference waves. Logic circuit INV LOG also derives firing pulses for the auxiliary commutation SCR's A1' and A2' during certain VCO pulses. For example, it may derive a signal ABFP (FIG. 2g) to fire commutation SCR A1' at the trailing edge of square wave A. The logic circuit INV LOG may perform the following Boolean equations:

A1 = AX

A1' = ABFP + ACRP

A2 = $\overline{A}$X

B2' = $\overline{AB}$FP + $\overline{BA}$RP

B1 = BX

B1' = BCFP + BARP

B2 = $\overline{B}$X

B2' = $\overline{BC}$FP + $\overline{BA}$RP

C1 = CX

C1' = CAFP + CBRP

C2 = $\overline{C}$X

C2' = $\overline{CA}$FP + $\overline{CB}$RP

Only a portion of circuit INV LOG for SCR's A1, A2 and A1' is shown in FIG. 3. A manually operated direction selecting lever DS derives a direction command signal which is applied to INV LOG and controls forward and reverse rotation of motor M. The direction command signal is the logical 1 reverse signal R when switch DS is open and is logical 0 when DS is closed. An inverting gate 19 receiving signal R as an input derives its inversion which is the forward signal F. A differentiating circuit R10, C10 derives a spike pulse P (FIG. 2h) from each VCO pulse. A NAND gate 20 combines the signals F and P, and an inverting gate 21 inverts the output from gate 20. A NAND gate 22 combines the signals R and P, and an inverting gate 23 inverts the output from gate 22.

An AND gate 24 may combine the phase square wave reference signal A with the high frequency firing pulses X to derive signal AX (FIG. 2f) which is coupled to firing circuit FC for gating SCR A1. An AND gate 25 may combine the phase reference square wave signal B with the signal FP to derive signal BFP which is an input to an OR gate 26. The output of gate 26 may be coupled to one input of a NAND gate 27 which receives reference signal A on its other input to derive signal ABFP (FIG. 2g) which is coupled to firing circuit FC and regulates when commutation rectifier A1' is gated on. A NAND gate 28 may combine the square wave reference signal $\overline{A}$ with firing pulses X to derive signal $\overline{AX}$ (FIG. 2i) which is coupled to firing circuit FC and controls when SCR A2 is gated on.

The analog speed reference, or speed command signal is applied to a voltage boost circuit VB shown in block form which allows selective modification of the volts/hertz curve at low motor speed to offset the effects of relative impedance changes in motor M with variations in motor speed. Voltage boost circuit VB includes an inverting amplifier (not shown), so the modified analog speed reference signal output from voltage boost circuit VB is negative in polarity and is coupled through a resistance R25 to the inverting input of an error operational amplifier EA shown in FIG. 4. Error amplifier EA is of the summing type and compares the modified (negative polarity) speed reference signal to a voltage feedback signal from a sensor SEN shown in block form for detecting the average voltage across shunt chopper SHC and provides an output unidirectional error signal (FIG. 5b) proportional to their difference. The voltage feedback signal from sensor SEN is proportional to the average voltage across shunt chopper SHC and is coupled through a voltage-to-frequency adjusting network V/f ADJ comprising RH4, R22, C4 to the inverting input of error amplifier EA. Rheostat RH4 controls the amount of feedback and permits the ratio of voltage feedback to speed reference voltage (both of which should be proportional to the command signal) to be selectively varied. The magnitude of the unidirectional error signal (FIG. 5b) from EA is compared to a sawtooth wave comprising a train of generally triangular ramp pulses (FIG. 5a) from a constant frequency oscillator OSC in a comparator amplifier COMP AMP to derive variable width PWM pulses (FIG. 5c) which turn series chopper SEC on and off.

RAMP SIGNAL OSCILLATOR

Oscillator OSC may derive generally triangular ramp pulese (FIG. 5a) at 1 khz frequency and includes an operational amplifier A6 whose output is coupled through a charging resistor R34 to a capacitor C9 having one electrode grounded. The inverting input of A6 is coupled to capacitor C9, and the noninverting input of A6 is coupled to a point on a voltage divider including resistances R30 and R32 connected in series between a power source +12V and ground to normally maintain the noninverting input at approximately 8.9 volts. Such voltage divider also includes a positive feedback resistance R31 connected between the output and the noninverting input of amplifier A6 and a resistance R35 connecting the output of A6 to the power source +12V.

Capacitor C9 is charged through R34 and R35 from the power source +12V and also through R34 from the output of A6 until the voltage on C9 applied to the inverting input of A6 is equal to the voltage (8.9 volts) set on the noninverting input of A6 by voltage divider R30, R32, R31, R35. Operational amplifier A6 then switches to the low state, and the resulting low output voltage from A6 is positively fed back through R31 to the noninverting input of A6 which then assumes a potential of approximately 3 volts. Capacitor C9 then discharges through R34 in parallel with the series arrangement of a resistance R33 and a diode D17 connected between the output and the inverting input of A6, until the capacitor voltage again equals the potential on the noninverting input of A6. At this point, amplifier A6 again switches to the high state, and the cycle repeats. The voltage appearing across capacitor C9 is thus a ramp, or sawtooth signal of approximately 8.9 volts maximum and 3 volts minimum (FIG. 5a) and is applied to the noninverting input of a comparator amplifier COMP AMP. The unidirectional error signal from EA (FIG. 5b) is coupled through a resistance R29 to the inverting input of comparator amplifier COMP AMP and the interaction between these two signals determines the variable width output PWM signals (FIG. 5c) from COMP AMP which control the switching of series chopper SEC.

A transistor Q2 having its emitter grounded and its collector coupled to the output of A6 synchronizes the 1 khz oscillator OSC with the modulation frequency controlling VCO pulses whose frequency is six times motor frequency. The VCO pulses (FIG. 5d) are applied to the base of Q2 through a resistance R37 and a differentiating circuit C10, R42 which derives spike pulses that turn on Q2 for a very short time of approximately 1 microsecond. Turning on Q2, in effect, grounds the output of A6 and phase locks the VCO and ramp pulses together so that the ramp pulse SYNC (see FIG. 5a) then being generated is terminated. Consequently, a new ramp pulse will be started coincident with each VCO pulse and at the leading edge of each reference square wave A, B, C since 3 GEN is controlled by the VCO pulses. Such phase locking of the 1 khz ramp signals and the VCO pulses resets the series chopper SEC at the beginning of each half cycle of drive frequency to assure that chopping is identical in both half cycles of the fundamental frequency. As represented in FIG. 5e, series chopper SEC is turned on at the beginning of each ramp pulse and is turned off when the ramp pulse reaches the magnitude of the error signal.

The series arrangement of a diode D16 and a capacitor C8 connected between the inverting input of comparator amplifier COMP AMP and the output of amplifier A6 impresses a narrow negative-going pulse NP (FIG. 5b) on the output of error amplifier EA each time amplifier A6 of the 1 khz oscillator OSC switches to the low state. Resistance R29 increases the output impedance of error amplifier EA sufficiently to allow narrow pulse NP to appear. Capacitor C8 charges from the error signal through R29 and D16 and is discharged through a resistance R36 having one side connected to the junction between D16 and C8 and its opposite end connected through a diode D15 to the +12V power source. Each time amplifier A1 switches to the low state, capacitor C8 is switched abruptly in the negative-going direction and pulls the junction of R29 and D16 negative to impress spike pulse NP on the error signal output from EA. Pulse NP so superimposed on the error signal assures that comparator amplifier COMP AMP always switches at the 1 khz rate.

COMPARATOR AMPLIFIER

Comparator amplifier COMP AMP receives on its inverting input the error signal (FIG. 5b) having spike pulses NP superimposed thereon and receives on its noninverting input the 1 khz ramp pulses (FIG. 5a) from capacitor C9. Comparator amplifier COMP AMP compares these two inputs and derives the leading edge of a rectangular width PWM pulse when the two inputs are equal, as illustrated in FIG. 5c. As each positive-going leading edge of a ramp signal crosses the level of the error signal, comparator amplifier COMP AMP switches to the high, or logical 1, state to derive the leading edge of a rectangular PWM pulse. When amplifier A6 of OSC switches to the low state, the trailing edge of each sawtooth, or ramp, signal again crosses the unidirectional error signal and causes COMP AMP to switch to the low state and derive the trailing edge of each PWM pulse. It will be appreciated that the position of the leading edge of the PWM pulse will vary as the level of the error amplifier output signal changes, thereby varying the width of the PWM pulses and the average voltage applied to motor M. The output from error amplifier EA is kept within the proper range by the voltage feedback from across the shunt chopper SHC. When the analog speed reference, or command signal, calls for more voltage than is available, the error amplifier output level will be greater than the 8.9 volt peak level of the ramp signals from C9, and consequently the comparator amplifier output will be continuous (instead of comprising PWM pulses), and consequently series chopper SEC will turn full on.

Logic gates 29, 30, 31, 32, 33, 34 convert the variable width PWM pulses (FIG. 5c) from COMP AMP into signals for controlling series chopper SEC and shunt chopper SHC and also permit selective turning of the choppers on and off. The PWM pulses from COMP AMP are coupled through an inverter gate 29 to one input of a NOR gate 30 which receives the VCO pulses on its other input to hold series chopper SEC on for the duration of each VCO pulse, thereby keeping the commutation capacitors such as CA charged during commutation. In the interim between the VCO pulses, the output of gate 30 follows the PWM pulses and is coupled to one input of a NOR gate 31 whose other input receives a spike pulse from a differentiating circuit C11, R38 in response to each VCO pulse input. This spike pulse provides a logical 0 "chopper logic reset signal" output from gate 31 which is coupled to series chopper SEC and turns off SEC for approximately 2 microseconds at the start of commutation (see FIG. 5e). The two microsecond pulse from gate 31 resets the chopper logic CH LOG as described hereinafter to insure it is ready to turn on (if not already on). Series chopper SEC is pulsed off and back on again in this manner for every commutation in order to insure that the commutation capacitors will always have a charge source, and the length of time that SEC is pulsed off for each commutation limits overcharge on the commutation capacitors.

The output from gate 31 is coupled to one input of a NAND gate 33 and is also coupled through an inverting gate 32 to one input of a NAND gate 34. The outputs from gates 33 and 34 drive a two-wire shielded cable S1, S2 (see FIG. 6) differentially to regulate the chopper logic CH LOG and assure that the series and shunt choppers are always in the opposite conductive state. As shown in the truth table in FIG. 4, when gate 34 is logical 1 and gate 33 is logical 0 series chopper SEC is on and shunt shopper SHC is off. If the polarity is reversed so gate 33 is logical 1 and gate 34 is logical 0, the shunt chopper SHC is on. If both gates 33 and 34 are logical 1, both choppers SEC and SHC are turned off. Therefore, a logical 0 (shown as ground) from an ON/OFF switch applied to one input of both gates 33 and 34 can be used to turn both choppers SEC and SHC off.

CHOPPER CONTROL LOGIC

The chopper control logic CH LOG is the same but separate for both series chopper SEC and shunt chopper SHC, and only that for series chopper SEC is illustrated in FIG. 6. The PWM pulses from gates 33 and 34 are differentially coupled through the shielded twisted pair of cable S1, S2 and applied across two series connected resistances R5 and R6 (FIG. 6) having their junction grounded. A diode 36 of an optical isolator coupler A3 for series chopper SEC is connected in series with a resistance R4 across R5, R6 so diode 36 is forward biased when gate 33 is logical 0 and gate 34 is logical 1. A similar optical isolator coupler A5 for shunt chopper SHC is shown only in block form and includes a diode 37 connected in inverse polarity to diode 36 so that the two diodes 36 and 37 are always in opposite conductive states and only one diode can be forward biased at any one time. This makes it impossible to turn both choppers SEC and SHC on at the same time.

Turning on light-emitting diode 36 also turns on a photo diode 38 within optical coupler A3 and results in turning on a transistor 39. Turning on transistor 39 applies the "positive emitter—PE" or logical 0 potential to one input of a NAND gate 40 to force its output to logical 1. Logical 1 output from gate 40 (FIG. 7b) is applied to input pins 3 and 13 of an integrated circuit MONO (such as MC 14528 commercially available from Motorola Corporation) which may embody two monostable multivibrators to remove the "clear" signal therefrom and may also be coupled to input pin 4, after an RC time delay provided by resistance R7 and capacitor C7, to trigger the first monostable multivibrator. The triggered monostable then provides a logical 0 output (FIG. 7c) on $\overline{Q}$ output pin 7 to a NAND gate 41 which consequently provides a logical 1 output to a power driver PD which holds the series chopper SEC off for a sufficient time delay to permit shunt chopper SHC to turn off. The logical 1 from gate 40 is also applied to an input of gate 41. After the first monostable times out, its $\overline{Q}$ output on pin 7 goes to logical 1 (FIG. 7c) which is applied to pin 12 through an RC network R11, C19 to trigger the second monostable multivibrator so that its $\overline{Q}$ output on pin 9 goes to logical 0 which is applied to an input of a NAND gate 43 and also to an input of a NAND gate 45 of a latch 45, 46. The logical 0 from the second multivibrator on $\overline{Q}$ output pin 9

(FIG. 7d) provides a logical 1 output from gate 43 so that all three inputs to gate 41 are now logical 1, thereby providing a logical 0 output which turns on the power driver stage PD and the series chopper SEC which is shown as two Darlington arrangements of NPN transistors Q11 and Q12 in parallel. The output of gate 41 will remain at logical 0 for the length of the "guard pulse" period of the second monostable multivibrator. During this time transistors Q11 and Q12 should turn on and go into saturation, thereby providing a logical 1 output from a conduction limit circuit CL (shown in block form) to latch 45, 46 in the manner disclosed in U.S. Pat. No. 3,855,520 to Frederick A. Stich having the same assignee as this invention. The period of the second multivibrator determines the width of the "guard pulse" during which the series chopper SEC is turned on at the beginning of each PWM pulse and which is shorter than the interval which the chopper transistors can be out of saturation without being damaged.

When Q11 and Q12 turn on, both inputs to gate 46 are now logical 1 so it provides a logical 0 output to gate 45 to switch the latch 45, 46 to a logical 1 output and keep series chopper SEC on when the second monostable times out and its $\overline{Q}$ output at pin 9 goes to logical 1. Thus if series chopper transistors Q11 and Q12 turn on during the "guard pulse" (i.e., while the $\overline{Q}$ output of the second monostable in pin 9 is logical 0), the logical 1 from the latch will be converted by NOT gate 44 to logical 0 to hold the output of gate 43 at logical 1, the output of gate 41 at logical 0, and the series chopper SEC on. However, if transistors Q11 and Q12 do not turn on, the $\overline{Q}$ output on pin 9 of the second monostable will go to logical 1 at the end of its period so gate 43 will go to logical 0 and gate 41 to logical 1 to turn off the power driver stage PD and the series chopper SEC at the end of the guard pulse. The guard pulse width, which is determined by the period of the second monostable, is short enough to permit the series chopper transistors Q11 and Q12 to turn on into a direct short circuit without damage. Further, if the transistors Q11 and Q12 pull out of saturation at any time, the conduction limit circuit CL will be triggered to apply logical 0 to gate 46 of the latch to turn off series chopper SEC. The logical 0 input to gate 46 will apply logical 1 to gate 45 so its output goes to logical 0 to obtain logical 1 output from gate 44, and the logical 1 from gate 44 will provide logical 0 from gate 43 so that the output of gate 41 goes to logical 1 to turn off the power driver stage PD and series chopper transistors Q11 and Q12.

Inasmuch as the disclosed adjustable speed motor drive system has no filter with storage elements between series chopper SEC and inverter bridge, the current from the unidirectional source to the series chopper can be directly limited by the disclosed conduction limit arrangement, and thus the inverter can feed directly into a short circuit without damaging the load current carrying semiconductor switches A1-C2.

While only a single embodiment of our invention has been illustrated and described, many modifications and variations thereof will be readily apparent to those skilled in the art, and consequently it should be understood that we do not intend to be limited to the particular embodiment shown and described.

The embodiments of the invention in which an exclusive property or privilege is claimed are defined as follows:

1. A variable frequency, variable voltage power supply which does not require a filter between the series chopper and the inverter comprising, in combination, a static polyphase inverter adapted to be coupled to a unidirectional power source and including a plurality of semiconductor switches and having n output phases,
    a semiconductor series chopper connected in one polarity of said source between said source and said inverter,
    a semiconductor shunt chopper switch connected in shunt to said inverter at the output of said series chopper,
    means to control the switching of said inverter semiconductor switches at a modulation frequency which is a function of the magnitude of an analog speed reference signal,
    means for time ratio controlling said series chopper as a function of the magnitude of said speed reference signal, and
    means for maintaining said shunt chopper switch in the opposite conductive state from said series chopper.

2. A variable frequency, variable voltage power supply in accordance with claim 1 wherein said static inverter includes first and second load current carrying semiconductor switches in each output phase with the phase output terminal therebetween, a plurality of feedback diodes each of which is in inverse polarity shunt relation to one of said semiconductor switches, and a free-wheeling diode in inverse polarity parallel relation with said shunt chopper switch, and wherein said shunt chopper switch is in parallel relation to the series arrangements of load current carrying semiconductor switches in the inverter output phases and together with said free-wheeling diode and said feedback diodes provides low impedance, bidirectional free-wheeling paths for load current where said series chopper is turned off.

3. A variable frequency, variable voltage power supply in accordance with claim 1 wherein said time ratio controlling means includes a constant frequency oscillator and means for switching said series chopper on and off at the constant frequency of said oscillator.

4. A variable frequency, variable voltage power supply in accordance with claim 3 wherein said time ratio controlling means also includes means for regulating the width of the pulses conducted by said series chopper as a function of the magnitude of said speed reference signal.

5. A variable frequency, variable voltage power supply in accordance with claim 4 in which said time ratio controlling means also includes means for sensing the average voltage across said shunt chopper switch and for deriving a feedback signal which is a function of the magnitude thereof, and means for comparing said feedback signal to said analog speed reference signal and for deriving a steady state error signal which is a function of their difference, said means for regulating the width of pulses conducted by said series chopper being controlled by said error signal.

6. A variable frequency, variable voltage power supply in accordance with claim 5 wherein said constant frequency oscillator derives a train of generally triangular ramp pulses and wherein said pulse width regulating means is controlled by variable width signals which result from the interaction of said ramp pulses and said steady state error signal.

7. A variable frequency, variable voltage power supply in accordance with claim 6 wherein said means to control the switching of said inverter semiconductor switches includes a voltage controlled oscillator for deriving a train of modulation frequency controlling pulses whose frequency is a function of the magnitude of said analog speed reference signal, and a signal generator for generating $n$ phase reference waves displaced $360/n$ electrical degrees apart which are synchronized to said modulation frequency controlling pulses and which are associated with the respective output phases of said inverter and regulate the switching of the semiconductor switches therein.

8. A variable frequency, variable voltage power supply in accordance with claim 7 wherein said series chopper is a transistor and including means for synchronizing the switching of said series chopper to said modulation frequency so that said series chopper is reset at the beginning of each half cycle of the fundamental frequency inverter output.

9. A variable frequency, variable voltage power supply in accordance with claim 8 wherein said means for synchronizing includes means responsive to said modulation frequency controlling pulses for reducing the output of said constant frequency oscillator to minimum value so that the succeeding ramp pulse generated thereby begins from zero.

10. A variable frequency, variable voltage power supply in accordance with claim 7 wherein said time ratio controlling means also includes means for turning on said series chopper during said modulation frequency controlling pulses.

11. A variable frequency, variable voltage power supply in accordance with claim 10 wherein said static inverter includes first and second load current carrying controlled rectifiers in each phase with the phase output terminal therebetween and also includes commutation controlled rectifiers in each phase for commutating off said load current carrying rectifiers, and wherein said means to control the switching of said inverter switches removes gating signals from said load current carrying rectifiers during said modulation frequency controlling pulses and derives gating signals for said commutation rectifiers in the respective phases during modulation frequency controlling pulses at the edges of the associated reference waves.

12. A variable frequency, variable voltage power supply in accordance with claim 11 wherein said inverter has a free-wheeling diode in inverse polarity parallel relation with said shunt chopper switch and feedback diodes in inverse polarity shunt relation to said load current carrying rectifiers and said shunt chopper switch is in parallel to the series arrangements of load current carrying rectifiers in the inverter phases and coacts with said feedback diodes and said free-wheeling diode to provide low impedance, bidirectional, free-wheeling current paths when said series chopper is turned off.

13. A variable frequency, variable voltage power supply in accordance with claim 12 wherein said inverter is three phase and said reference wave generating means derives three 120° displaced reference waves and their inversions at one-sixth the frequency of said modulation frequency controlling pulses and wherein said reference waves and their inversions respectively control the switching of the first and second load current carrying rectifiers in the associated inverter phases.

14. A system for supplying variable frequency, variable magnitude voltage from a unidirectional source to a polyphase load comprising, in combination, a static polyphase inverter coupled to said source and having a plurality of semiconductor switches and a plurality of output phases, a semiconductor series chopper connected in one polarity of said source between said source and said inverter, a semiconductor shunt chopper switch connected in shunt to said inverter at the output of said series chopper, time ratio controlling means including a constant frequency oscillator for turning said series chopper on and off at the constant frequency of said oscillator and for regulating the width of pulses conducted by said series chopper as a function of an analog speed reference signal, means for controlling the fundamental output frequency of said inverter as a function of said analog speed reference signal including a voltage controlled oscillator for deriving a train of modulation frequency controlling pulses whose frequency is a function of the magnitude of said analog speed reference signal and a generator for deriving a plurality of phase-displaced reference waves which are synchronized to said modulation frequency controlling pulses and are respectively associated with the inverter phases and regulate the switching of the semiconductor switches in the respective inverter phases, and means for switching said shunt chopper switch so that it is in the opposite conductive state from said series chopper, whereby no filter is required between said series chopper and said inverter.

15. A variable frequency, variable voltage supply system in accordance with claim 14 wherein said static inverter includes first and second load current carrying semiconductor switches in each output phase with the phase output terminal therebetween, a free-wheeling diode in inverse polarity parallel relation with said shunt chopper switch, a plurality of feedback diodes each of which is in inverse polarity shunt relation to one of said semiconductor switches, and wherein said shunt chopper switch coacts with said free-wheeling diode and said feedback diodes to provide low impedance, bidirectional free-wheeling paths for load current when said series chopper is turned off.

16. A variable frequency, variable voltage supply system in accordance with claim 14 wherein said constant frequency oscillator derives a train of generally triangular ramp pulses and said time ratio controlling means includes a comparator for comparing said ramp pulses to a steady state signal whose magnitude is a function of said analog speed reference signal to derive variable width pulses whose width is a function of their difference and which control the switching of said series chopper.

17. A variable frequency, variable voltage supply system in accordance with claim 16 and including a sensor for deriving a feedback signal which is proportional to the average voltage across said shunt chopper switch, and means for comparing said feedback signal to said analog speed reference signal to derive a unidirectional error signal which is a function of their difference, said error signal constituting said steady state signal.

18. A variable frequency, variable voltage supply system in accordance with claim 16 wherein said series chopper is a transistor and said inverter has a freewheeling diode in inverse polarity parallel relation with said shunt chopper switch and first and second load current carrying controlled rectifiers in series in each phase with the output terminal at the junction therebetween and also has commutation controlled rectifiers in each phase for commutating off said load current carrying controlled rectifiers, and wherein said means for controlling inverter fundamental output frequency removes gating pulses from said load current carrying rectifiers so they can be commutated off during said modulation frequency controlling pulses and said time ratio controlling means turns on said series chopper during said modulation frequency controlling pulses.

19. A variable frequency, variable voltage supply system in accordance with claim 18 wherein said means for controlling inverter fundamental output frequency supplies gating pulses to the commutation rectifiers in the respective inverter phases during modulation frequency controlling pulses at the edges of the associated reference waves.

20. A variable frequency, variable voltage supply system in accordance with claim 19 wherein said inverter has feedback diodes in inverse polarity shunt relation to said load current carrying controlled rectifiers and said time ratio controlling means provides signals to turn said shunt chopper switch on during the off-time of said series chopper so that said shunt chopper switch coacts with said feedback diodes and said free-wheeling diode to form low impedance, bidirectional, free-wheeling paths for load current.

21. A variable frequency, variable voltage supply system in accordance with claim 20 wherein said means for controlling the fundamental inverter output frequency regulates the switching of the first and second load current carrying controlled rectifiers in each phase in accordance with the associated reference wave and its inversion respectively.

22. A variable frequency, variable voltage supply system in accordance with claim 18 and including synchronizing means for phase locking said ramp pulses and said modulation frequency controlling pulses so that said series chopper is reset at the beginning of each half cycle of inverter fundamental output frequency.

23. A variable frequency, variable voltage supply system in accordance with claim 22 wherein said generator derives reference waves whose leading edges occur at said modulation frequency controlling pulses and said synchronizing means includes means responsive to said modulation frequency controlling pulses to reduce the output of said constant frequency oscillator to minimum value so that the succeeding ramp pulse generated thereby begins from zero.

24. An adjustable speed electric motor drive which does not require a filter between the series chopper and the inverter comprising, in combination,
 a unidirectional electric power source,
 an inverter having $n$ output phases and positive and negative load current carrying semiconductor switches in series in each output phase with an output terminal at the junction therebetween for connection to the respective phase windings of said motor and also having feedback diodes in inverse polarity shunt relation with said semiconductor switches,
 a semiconductor transistor series chopper in one polarity of said source between said source and said inverter,
 a semiconductor shunt chopper switch connected at the output of said series chopper in shunt with said series arrangement of positive and negative switches in each inverter output phase,
 a free-wheeling diode in inverse polarity parallel relation with said shunt chopper switch,
 voltage controlled oscillator means for deriving a train of modulation frequency controlling pulses whose frequency is a function of the magnitude of an analog speed reference signal,
 a generator for deriving $n$ phase reference waves synchronized to said modulation frequency controlling pulses and displaced $360/n$ electrical degrees each of which is associated with one phase of said inverter,
 means for controlling the switching of the semiconductor switches in the respective phases of said inverter as a function of the associated phase reference waves,
 oscillator means for generating a train of constant frequency generally triangular ramp pulses,
 sensing means for deriving a feedback signal proportional to the average voltage across said shunt chopper switch,
 means for comparing said analog speed reference signal to said feedback signal and for deriving a unidirectional error signal which is a function of their difference,
 means for comparing said error signal to said train of ramp pulses to derive variable width signals at said constant frequency whose width is a function of the magnitude of said error signal, and
 pulse width modulating means for switching said series chopper in accordance with said variable width signals and for switching said shunt chopper switch to the opposite conductive state from said series chopper.

25. An electric motor drive in accordance with claim 24 wherein said pulse width modulating means includes means for turning on said series chopper during said modulation frequency controlling pulses.

26. An electric motor drive in accordance with claim 25 and including means for synchronizing the switching of said series chopper to said reference waves so that said series chopper is reset at the beginning of each half cycle of inverter fundamental output frequency and chopping is the same in the positive and negative half cycles thereof.

27. An electric motor drive in accordance with claim 26 wherein said synchronizing means includes means for locking the phase of said ramp pulses to that of said modulation frequency controlling pulses.

28. An electric motor drive system in accordance with claim 25 wherein said load current carrying semiconductor switches are controlled rectifiers and said inverter has commutation controlled rectifiers in each phase for commutating off said load current carrying rectifiers and said means for controlling the switching of the semiconductor switches includes means for removing gating pulses from said load current carrying rectifiers during said modulation frequency controlling pulses and for deriving gating pulses for the commutation rectifiers in the respective inverter phases during said modulation frequency controlling pulses at the edges of the associated reference waves.

29. An electric motor drive system in accordance with claim 28 wherein said pulse width modulating means turns said shunt chopper on while said series chopper is off so that said shunt chopper coacts with said free-wheeling diode and said feedback diodes to form low impedance, bidirectional, free-wheeling paths for motor current.

* * * * *